United States Patent [19]

Ashley et al.

[11] Patent Number: 5,078,919
[45] Date of Patent: Jan. 7, 1992

[54] COMPOSITION CONTAINING AEROGEL SUBSTRATE LOADED WITH TRITIUM

[75] Inventors: Carol S. Ashley; C. Jeffrey Brinker, both of Albuquerque, N. Mex.; Robert E. Ellefson, Centerville; John T. Gill, Miamisburg, both of Ohio; Scott Reed; Robert J. Walko, both of Albuquerque, N. Mex.

[73] Assignee: The United States of America as represented by the United States Department of Energy, Washington, D.C.

[21] Appl. No.: 495,578

[22] Filed: Mar. 20, 1990

[51] Int. Cl.$^5$ ............................................. C09K 11/04
[52] U.S. Cl. .......................... 252/646; 252/301.4 R; 252/301.6 S; 250/485.1; 250/361 R; 250/484.1; 428/690; 362/84
[58] Field of Search .......... 252/646, 301.4 R, 301.6 S; 362/84; 250/483.1, 484.1 R, 361 R; 428/690

[56] References Cited

U.S. PATENT DOCUMENTS

| | | | |
|---|---|---|---|
| 2,749,251 | 6/1956 | Shapiro | 428/328 |
| 2,935,481 | 5/1960 | Hochwalt | 252/301.16 |
| 3,210,288 | 10/1965 | Charlton et al. | 252/646 |
| 3,224,978 | 12/1965 | MacHutchin et al. | 252/646 |
| 3,238,139 | 3/1966 | Fischer et al. | 252/646 |
| 3,342,743 | 9/1967 | Rosenberg | 252/646 |
| 3,366,573 | 1/1968 | Feuer | 252/646 |
| 3,706,893 | 12/1972 | Olsen et al. | 310/3 B |
| 4,275,300 | 6/1981 | Abbott | 250/304 |
| 4,327,065 | 4/1982 | von Dardel et al. | 423/338 |
| 4,396,528 | 8/1983 | Abbott | 252/301.17 |
| 4,595,599 | 6/1986 | Brown et al. | 427/5 |
| 4,855,879 | 8/1989 | Soltani et al. | 362/84 |
| 4,889,660 | 12/1989 | Tensen et al. | 252/646 |
| 4,911,830 | 3/1990 | Bromley et al. | 252/301.16 |
| 4,997,597 | 3/1991 | Clough et al. | 252/646 |

OTHER PUBLICATIONS

McKlveen et al., "Radioisotope-Powered Photovoltaic Generator", Nuclear Technology 43:366-372 (May 1979).
Birks et al., Scintillation Counters, McGraw-Hill Book Co., Inc., 1953.
Goldberg (ed.), Lumination of Inorganic Solvents, "Cathodoluminescence", pp. 151-184, 1966.
Leverenz, "Cathodoluminescence as Applied in Television", RCA Manufacturing Co., Inc., Harrison, N.J., pp. 131-175.
Leverenz, "Phosphors Versus the Periodic System of the Elements", Proceedings of the I.R.E., May 1944, pp. 256-263.
Feldman, "Development and Applications of Transparent Cathode-Ray Screens", Journal of the S.M.P.T.E., vol. 67, 7-58, pp. 455-460.
Ludwig et al., "The Efficiency of Cathode-Ray Phosphors", J. Electrochem. Soc., vol. 117, No. 3, Mar. 1970, pp. 348-353.
J. D. Kingsley et al., "The Efficiency of Cathode-Ray Phosphors", J. electrochem. Soc., vol. 117, No. 3, Mar. 1970, pp. 353-359.

*Primary Examiner*—Brooks H. Hunt
*Assistant Examiner*—Ngoclan Mai
*Attorney, Agent, or Firm*—Millen, White & Zelano

[57] ABSTRACT

The invention provides a process for loading an aerogel substrate with tritium and the resultant compositions. According to the process, an aerogel substrate is hydrolyzed so that surface OH groups are formed. The hydrolyzed aerogel is then subjected to tritium exchange employing, for example, a tritium-containing gas, whereby tritium atoms replace H atoms of surface OH groups. OH and/or CH groups of residual alcohol present in the aerogel may also undergo tritium exchange.

15 Claims, 4 Drawing Sheets

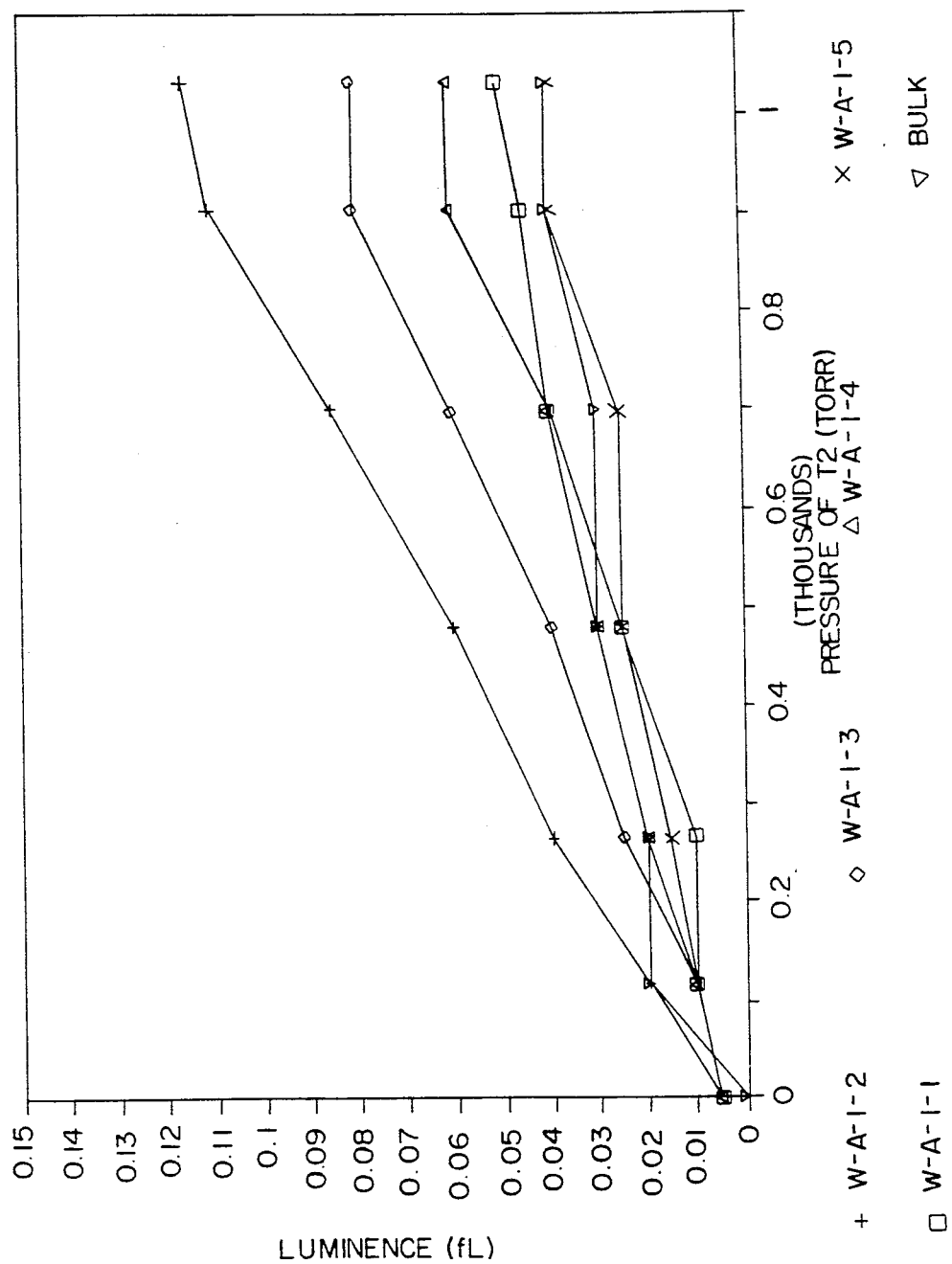

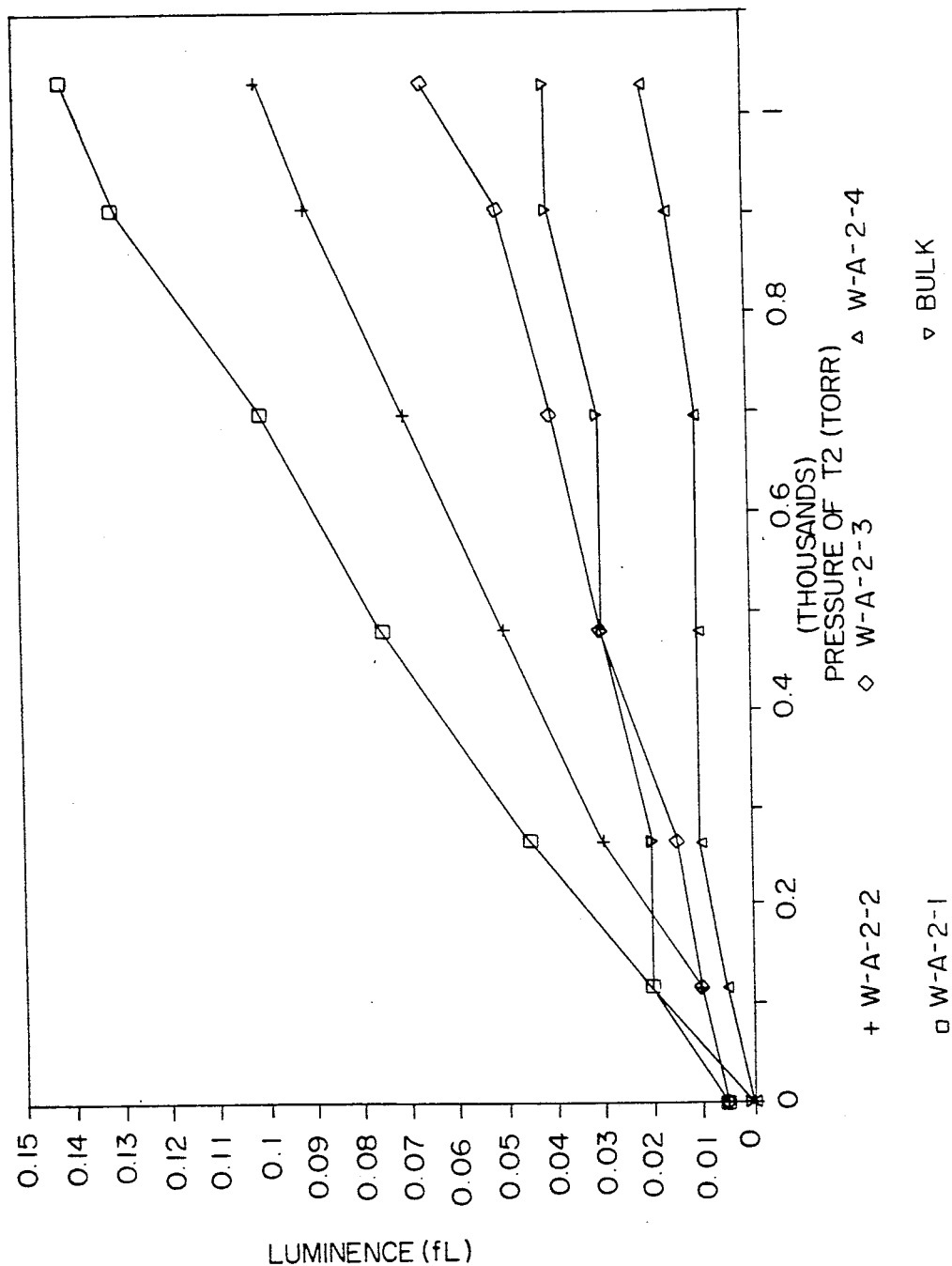

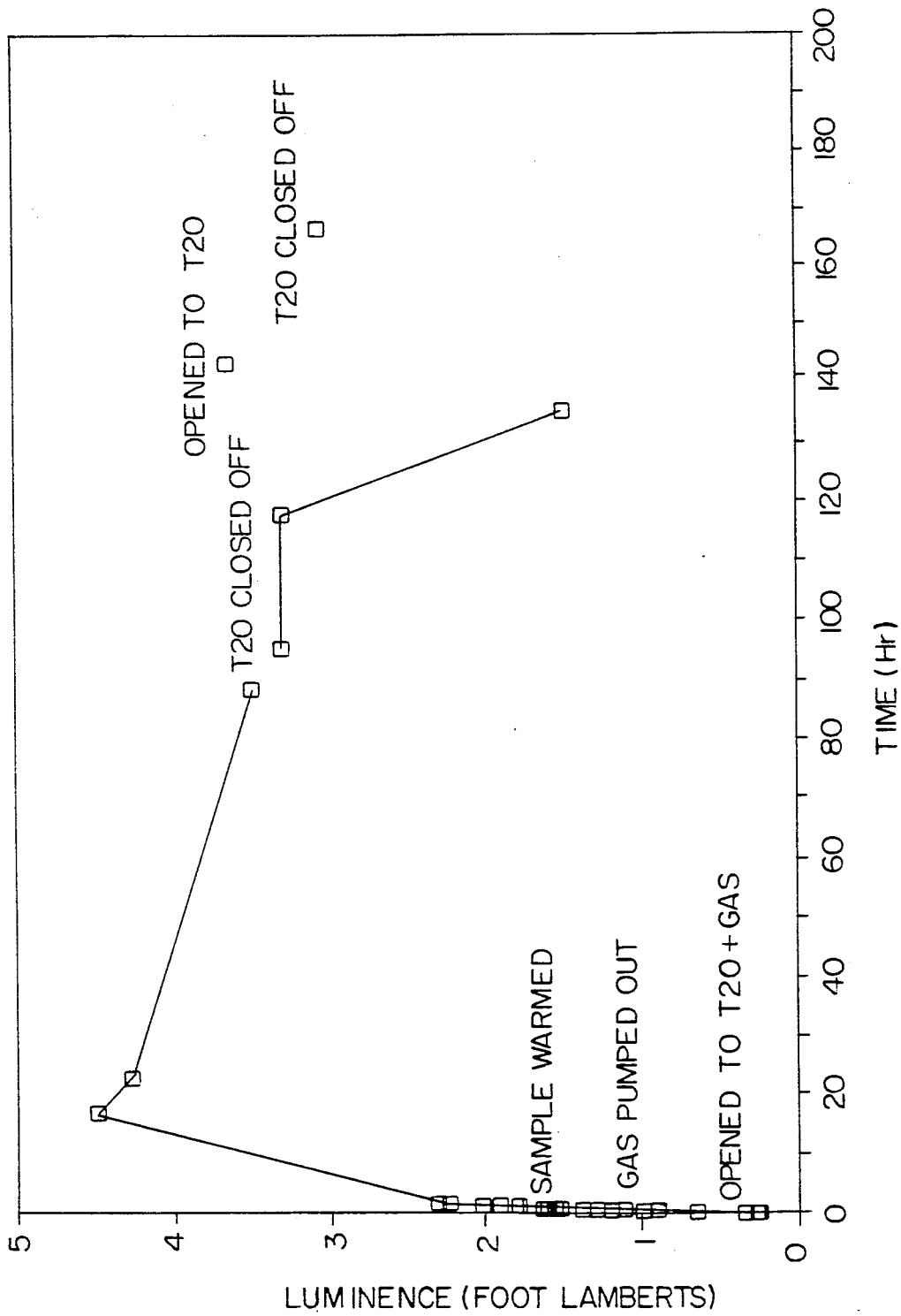

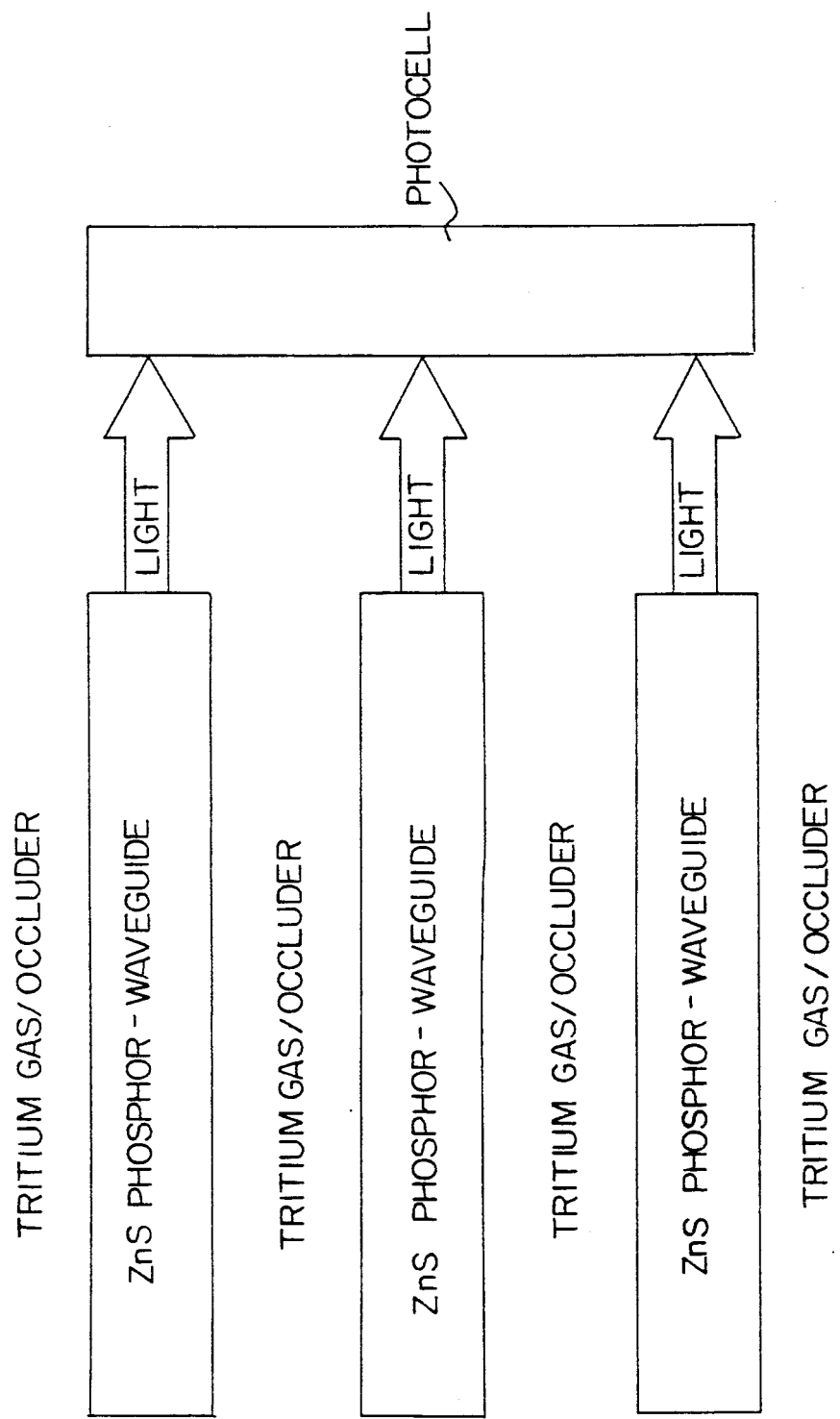

COMPOSITION CONTAINING AEROGEL SUBSTRATE LOADED WITH TRITIUM

BACKGROUND OF THE INVENTION

The present invention relates to solid-state radiation-emitting compositions and devices. The U.S. government has rights in this invention pursuant to Contract No. DE-AC04-76DP00789 between the U.S. Department of Energy and AT&T Technologies, Inc.

The present invention relates to compositions and devices which emit radiation through the employment of a first substance functioning as a source of an exciting radiation and a second substance which interacts with the exciting radiation to provide an emitting radiation. In particular, the present invention relates to luminescent compositions and devices, especially radioluminescent compositions and devices.

Compositions providing radioluminescence are well known and are, for example, used as alternatives for conventional electric light sources. Radioluminescent lamps have been employed in such applications as safety lighting, emergency signs (e.g., exit signs), airport runway lights, background lighting for aircraft and space applications, and other applications where electrical light is either difficult or impossible.

Conventional radioluminescent lamps comprise a phosphor powder which is deposited on the inside surface of a hollow glass tube. Phosphoric acid or an organic binder is used to adhere the phosphor to the tube surface. The hollow glass tube is then evacuated and backfilled with a beta-emitting radioisotope, usually tritium gas. Beta particles produced by the radioactive decay of tritium atoms impinge upon the phosphor resulting in the release of energy in the form of light. See, e.g., U.S. Pat. No. 4,855,879 (Soltani et al.).

Unfortunately, while radioluminescent lamps are very useful for the above-described applications, their maximum light output is somewhat limited. Two effects contribute to the limitation of maximum light output for radioluminescent light sources. Firstly, based on calculations, the saturation power flux predicted for pure tritium gas at atmosphere (the typically used radioisotope) is only about 11 microwatts/cm$^2$ Tritium has a very low beta particle energy, i.e., $E_{ave} = 6$ keV and $E_{cutoff} = 18.6$ keV. Due to this low beta particle energy, self-absorption of the beta energy by the tritium gas itself becomes significant. For this reason, the beta particles that excite the phosphor deposit on the inside of the glass tube only can come from a limited gas thickness. Based on computer simulations, the predicted gas thickness is about 2 cm for 1 atmosphere of pure tritium gas. In conventional use, a tritium thickness of about 0.3 cm is typically used with 1.3 atmospheres of tritium in order to optimize the light output per curie of tritium gas used.

Secondly, due to the low average beta energy, beta particle penetration into the phosphor particles is limited to about 1-20 $\mu$m. Even though phosphor materials are very reflective, as a result of their high refractive index the phosphor layer deposits on the inside of the glass quickly become opaque to light even for deposits of only a few particles thick. For these reasons, increasing the thickness of the phosphor deposit on the inside layer of the tube does not result in an increase in brightness for a typical 1 atmosphere gas tube.

Moreover, there are important health and safety concerns which go hand-in-hand with the use of radioactive materials. Since radioluminescent lamps typically employ tritium gas as a radioisotope, there is much concern regarding emissions of tritium gas either by leakage or due to breakage of the hollow glass tube.

Another practical application of radioisotopes and luminescent materials is their use in nuclear or atomic batteries and photovoltaic generators. See, for example, Olsen et al. (U.S. Pat. No. 3,706,893) and McKlveen et al., "Radioisotope-Powered Photovoltaic Generator," Nuclear Technology 43:366-372 (May 1979).

For additional discussion on luminescent materials (e.g., phosphors and luminescent glasses) and their uses, see J. B. Birks et al., Scintillation Counters, McGraw-Hill Book Co., Inc., 1953; P. Goldberg (editor), Lumination of Inorganic Solvents, "Cathodoluminescence", pp. 151-184, 1966; H. W. Leverenz et al., Luminescent Materials, Vol. 10, July, 1939, pp. 479-493; H. W. Leverenz, "Cathodoluminescence as Applied in Television", RCA Manufacturing Co., Inc., Harrison, NJ, pp. 131-175; H. W. Leverenz, "Phosphors Versus the Periodic System of the Elements", Proceedings of the I.R.E., May, 1944, pp. 256-263; C. Feldman, "Development and Applications of Transparent Cathode-Ray Screens", Journal of the S.M.P.T.E., Vol. 67, July, 1958, pp. 455-460; G. W. Ludwig et al., "The Efficiency of Cathode-Ray Phosphors", J. Electrochem. Soc., Vol. 117, No. 3, March, 1970, pp. 348-353; and, J. D. Kingsley et al., "The Efficiency of Cathode-Ray Phosphors", J. Electrochem. Soc., Vol. 117, No. 3, March, 1970, pp. 353-359.

Related copending patent application Ser. No. 07/435,092, filed Nov. 13, 1989 (Clough et al.), hereby incorporated by reference, discloses radioluminescent compositions comprising a zeolite crystalline material in which is sorbed a tritium-containing component and at least one luminophore. The loaded zeolite can be suspended in an optically clear polymer or optically clear silica matrix (e.g., silica gel). Another disclosed embodiment comprises an optically clear polymer matrix, a soluble tritiated organic component containing olefinic or alkynylic bonds prior to tritiation and an organic scintillation dye for transferring primary scintillation to a red shifted emission.

SUMMARY OF THE INVENTION

This invention relates to compositions suitable as volumetric radiation sources. The invention further relates to novel radiation-emitting compositions and devices which do not exhibit the power limitations discussed above with respect to prior art radioluminescent lamps. This invention also provides compositions which safely retain or adhere radioactive material in such a manner as to prevent leakage. Furthermore, the invention provides processes for generating light and for loading a substrate with tritium. In addition, the invention relates to compositions which are of inorganic nature and thus exhibit a reduced susceptibility to radiation damage.

Upon further study of the specification and appended claims, further objects and advantages of this invention will become apparent to those skilled in the art.

A composition of this invention comprises:
a porous substrate loaded with
(a) a source of exciting radiation of a first energy, and
(b) a component capable of emitting radiation of a second energy upon interaction of the component with the radiation of the first energy, with the proviso that the porous substrate is not and does not contain a zeolite crystalline material.

A preferred embodiment of the invention is a composition comprising:

an aerogel substrate loaded with (a) a source of exciting radiation of a first energy, and (b) a component capable of emitting radiation of a second energy upon interaction of the component with the radiation of a first energy.

The invention further relates to composition comprising:

a porous substrate;

a source of exciting radiation of a first energy covalently bonded to the porous substrate; and the porous substrate being loaded with a component capable of emitting radiation of a second energy upon interaction of the component with the radiation of the first energy, with the proviso that the porous substrate is not and does not contain a zeolite crystalline material.

Another compositional embodiment of the invention is, in a radiation-emitting composition comprising tritium and a component which emits non-$\beta$ radiation upon interaction with $\beta$-radiation emanating from the tritium, the improvement wherein the emission of radiation is volumetric.

A further embodiment of the invention is a composition comprising:

(a) a porous substrate;

(b) a source of exciting radiation of a first energy; and (c) a component capable of emitting radiation of a second energy upon interaction of the component with the radiation of the first energy wherein the porous substrate is loaded with at least one of (b) and (c) in the form of a composite with a carrier material, with the proviso that the composite is not a zeolite crystalline material in which both (b) and (c) are loaded.

A further embodiment of the invention is a composition comprising:

(a) an aerogel substrate;

(b) a source of exciting radiation of a first energy; and (c) a component capable of emitting radiation of a second energy upon interaction with the radiation of the first energy wherein the aerogel substrate is loaded with at least one of (a) and (b) in the form of a composite with a carrier material.

Another embodiment of the invention is a composition comprising:

an aerogel or xerogel substrate loaded with tritium and a component capable of emitting radiation upon interaction of the component with beta particles emitted from the tritium, wherein the loading of the aerogel or xerogel substrate with tritium is performed by initially hydrolyzing the surface of the substrate and then subjecting the hydrolyzed substrate to tritium exchange, whereby tritium atoms replace hydrogen atoms of hydrolyzed surface groups.

Another embodiment of the invention is a composition comprising:

an aerogel substrate loaded with a component capable of emitting radiation of a second energy upon interaction with radiation of a first energy.

A further embodiment of the invention is a composition comprising:

an aerogel substrate loaded with a source of exciting radiation of a first energy.

The invention also relates to a radiation-emitting device which comprises a container having contained therein a composition as described above, wherein the container transmits the radiation of the second energy to a substantial degree.

Another embodiment of the invention is a battery or generator for the production of electrical energy comprising a composition as described above and a photovoltaic cell.

According to a process aspect, the invention provides a process for generating radiation comprising loading an aerogel substrate with (a) a source of exciting radiation of a first energy and (b) a component capable of emitting radiation of a second energy upon interaction of the component with the radiation of a first energy.

Another process embodiment of the invention is a process of loading an aerogel with tritium comprising exposing the aerogel to a tritium-containing gas whereby surface M—OH or M—O—M bonds, wherein M is a metal ion, are changed to form M—TO and M—T bonds.

A further embodiment of the invention is a process for loading an aerogel or xerogel substrate with tritium comprising:

hydrolyzing the surface of the aerogel or xerogel substrate; and subjecting the resultant hydrolyzed substrate to tritium exchange, whereby tritium atoms replace hydrogen atoms of hydrolyzed surface groups.

The invention also relates to a process of generating radiation comprising loading an aerogel substrate with:

(a) a source of exciting radiation of a first energy; and (b) a component capable of emitting radiation of a second energy upon interaction of the component with the radiation of a first energy; wherein at least one of (b) and (c) is in the form of a composite with a carrier material.

Also, the invention relates to a method of loading an aerogel substrate with tritium comprising forming a composite of tritium with a carrier material and loading an aerogel substrate with the resultant composite.

The inventive composition is advantageous in that it provides a volumetric radiation source, i.e., a radiation source in which the intensity of the emitted radiation can, to a certain degree, be increased by increasing the thickness of the composition. For example, as discussed above, increasing the tritium gas thickness in radioluminescent lamps beyond 2 cm or the phosphor layer thickness beyond 20 $\mu$m does not result in an increase in brightness due to self-quenching of tritium. Conversely, the thickness of the volumetric radiation source according to the invention surprisingly can be increased, e.g., at least up to about 2-3 mm with a resultant increase in radiation intensity.

The term "porous substrate" is intended to mean a solid structure of any suitable form or shape having a substantial porosity, e.g., at least about 30 vol. %, wherein the pores of the structure provide a surface for binding a source of exciting radiation of a first energy. The substrate is preferably one which exhibits a substantially high porosity and an associated high surface area so as to provide a large amount of surface per volume for binding the entity which serves as the source of exciting radiation of a first energy. A "highly porous substrate" in the context of the invention is a solid structure having a porosity of at least about 80 vol. %. Materials exhibiting a porosity of at least about 85 vol. %, particularly at least about 95 vol. %, and especially about 99 vol. %, are preferred for use as the porous substrate.

The pore size distribution of the substrate is generally in the range of about 1 nm to 500 nm, preferably about 1 nm to 200 nm, and especially about 1 nm to 50 nm. The surface area of the porous substrate is generally at least about 300 m$^2$/g, preferably at least about 500 m$^2$/g, particularly greater than about 1000 m$^2$/g, and especially about 1200 m$^2$/g.

The substrate is preferably a porous, inorganic material which is not and does not contain a zeolite crystalline material. Such substrates include, e.g., xerogels and aerogels.

The radiation of the second energy upon impingement on surfaces of the substrate is preferably highly transmitted therethrough. For example, when it is desired to emit radiation, e.g., light, externally from the composition, the substrate should be capable of transmitting at least a portion of the radiation of a second energy. In such cases, the substrate should transmit at least about 10%, 20%, 30%, etc. of the radiation of a second energy. The substrate also preferably transmits the radiation of the second energy to a substantial degree, e.g., at least about 40%. Preferably, at least about 50% of the radiation of the second energy is transmitted by the substrate, particularly at least 60, 70, 80, or 90% and especially about 100%.

The density of the porous substrate is not an important factor; low density material is preferred to minimize absorption of the radiation of a first energy by the substrate. The density is generally about 0.01–1.5 g/cm$^3$, preferably about 0.01–0.50 g/cm$^3$, especially about 0.01–0.3 g/cm$^3$.

Particularly preferred materials for the porous substrate are dried inorganic gels, i.e., xerogels and aerogels. The production of xerogels and aerogels is well known in the art, and they can be provided in a variety of shapes, e.g., cylinders, plates, sheets, or fibers. Aerogels and xerogels can, for example, be produced from essentially any composition capable of forming a gel. Typically, xerogels and aerogels are produced by the polymerization of components containing inorganic metal ions and oxygen ions such as metal oxides, alkoxides, and alcoholates. Metal sulfides may also be suitable. Polymerization results in the formation of a gel containing the polymerized material and a liquid as two continuous phases The liquid dispersion medium is removed by slow drying or supercritical drying and can result in little or no shrinkage of the underlying structure of the polymerized material.

Generally, xerogels are those structures resulting from air evaporation (or evaporation under normal conditions) of the liquid dispersion medium. Aerogels, which generally exhibit a higher porosity, are produced when drying is performed under supercritical conditions. For example, xerogels generally possess a porosity of up to about 80 vol.%, although higher porosities may be possible. Typically, xerogels have a porosity of up to about 60 vol.% Aerogels, on the other hand, can possess a higher porosity, e.g., greater than about 90 vol.%. For a detailed discussion regarding the production of both the xerogels and aerogels, see *Aerooels: Proceedings of the First International Symposium*, Wurzburg, Federal Republic of Germany, September 23-25, 1985, J. Frike, ed., Springer-Verlag, Berlin-Heidelberg (1986).

The materials used in the formation of aerogels and xerogels are, for example, oxides of such elements as Si, Al, B, Ti, Zr, V, Y, Mg, Mo Fe, etc. Examples of suitable starting materials include $SiO_2$, $Si(OCH_3)_4$, $Si(OC_2H_5)_4$, $AlOOH$, $Al(OC_4H_9)_3$, $B(OC_4H_9)_3$, $Ti(OC_3H_7)_4$, $Zr(OC_3H_7)<$, $TiO_2$, $ZrO_2$, etc., and mixtures thereof such as $SiO_2$-$Al_2O_3$, $SiO_2$-$ZrO_2$, $SiO_2$—$B_2O_3$, and $Al_2O_3$-$ZrO_2$. Preferably, the porous substrate is a silica aerogel.

In addition to high porosity, aerogel substrates have a further beneficial feature. Aerogels are resilient and compliant and thus tend to damp out vibrations. The ability to damp vibrations reduces the likelihood of breakage of a container holding the volumetric radiation source, thereby increasing the safety factor.

The term "loaded" is intended in the broadest sense of the word. Thus, loaded, e.g., means any form of association or contact, direct or indirect, which results in a composite composition, the components of which are capable of performing their intended functions (such as acting as a substrate, generating exciting radiation of a first energy, or emitting radiation of a second energy). Loaded thus includes, for example, any type of incorporation, such as encapsulation, embedding, entrapment, or the like, as well as any form of bonding such as physisorption, absorption, adsorption, chemisorption, covalent bonding, etc.

The source of exciting radiation of the first radiation can be any material which can be loaded onto and/or into the substrate and which emits electromagnetic radiation, nuclear radiation (radioactive decay), or an electron beam. The material can be a gas, liquid or solid under normal conditions (20 C and 1 atm). The radiation source material should not emit radiation of a type which will excessively damage either the substrate or the component which emits radiation of a second energy. The exciting radiation of a first energy can, for example, be X-rays, microwaves, radiowaves, gamma rays, alpha particles, beta particles, ultraviolet light, visible light, infrared light, or other forms of low energy photons. Preferably, the exciting radiation is in the form of beta particles or ultraviolet light.

The source of exciting radiation of a first energy is preferably a material capable of radioactive decay. In a preferred aspect of the invention, the exciting radiation is beta particles, the source of which is, for example, Ni-63, C-14, or tritium. Tritium is a preferred radioisotope, e.g., atomic tritium (T), $T_2$, or $T_2O$. Tritium can, for example, be either adsorbed onto the surface of the porous substrate or chemically bound directly thereto. Also, tritium-containing gas, e.g., $T_2$, can be trapped or contained within the pores of the substrate.

For example, in an aerogel, tritium, T, can be chemically bound directly to the aerogel by breaking the M—O—M bonds (M being a metal such as Si) and forming M—TO and possibly M—T bonds. Alternatively, the hydrogen atoms of surface OH groups can be replaced by T. Surface OH groups include the OH groups located on the external surface of the substrate as well as OH groups located on the surface of internal pores. Also, if the aerogel substrate contains residual alcohol, then additional tritium may be bound to the substrate by replacement of H atoms of the OH and/or CH groups of the alcohol with tritium to form TO and/or CT bonds.

Tritium can also be incorporated in situ during the preparation of the aerogel so long as an appreciable amount of tritium remains following the drying step for removal of solvent. But, this is not a preferred method of loading due to the hazards associated with handling of tritium. In the case of adsorption, the source of tritium to be adsorbed can, for example, be T, $T_2$, or $T_2O$.

According to one preferred aspect of the invention, an aerogel or xerogel substrate is initially subjected to hydrolysis, e.g., by exposure to $H_2O$ vapor, whereby surface OH groups are formed. The hydrolyzed aerogel or xerogel is then subjected to tritium exchange, for example, by bringing a tritium-containing gas, such as $T_2$, into contact with the hydrolyzed aerogel or xerogel. During the course of the tritium exchange, the H atoms of OH groups are replaced by T atoms.

The process of hydrolysis and tritium exchange is believed to result in an increased rate of tritiation in comparison to a nonhydrolyzed aerogel or xerogel treated with tritiated water, $T_2O$. The residual amounts of alcohol which may be present in the aerogel or xerogel are believed to increase the amount of tritium exchange such that more OH and/or CH groups of the residual alcohol form TO and/or CT bonds.

During the hydrolysis step of the above process embodiment, temperatures and pressures can vary widely. For example, the temperature can range from about ambient temperature to about 100° C., although lower and higher temperatures are also possible Similarly, the pressure at which the hydrolysis step is conducted can also vary widely, but preferably is carried out at about 1 atm. Conventional hydrolysis agents can be used to hydroxylate the surface of the aerogel or xerogel. Preferably, the hydrolysis agent is water vapor at about room temperature and about 100% humidity. Generally, the hydrolysis of the aerogel or xerogel surface is conducted in a gaseous environment.

When using water vapor as a hydrolysis agent, molecular water may physisorb on the aerogel or xerogel surface. Molecular water is preferably removed prior to the tritium exchange by, for example, baking the aerogel surface, e.g., at about 150° C.

For the tritium exchange step, again, the temperatures and pressures can vary widely. Generally, the tritium exchange is conducted at about room temperature, although higher temperatures may speed up the process of tritium exchange. Generally, temperatures within the range of 0°–400° C. are employed, although other operating temperatures are possible. The pressure can also vary widely for the tritium exchange step, ranging from sub-ambient to relatively high pressures. Preferably, the tritium exchange step is performed at slightly below ambient to about ambient pressure, although lower and higher pressures are also possible. A preferred tritium exchange agent is $T_2$ gas.

In the case of aerogels, negative beta particle emitters, are preferred as the source of radiation of the first energy. X-rays and low energy gamma rays are also acceptable radiation sources. On the other hand, positive beta emitters can cause damage to the substrate due to the high level of annihilation gamma rays given off. Similarly, alpha particles can potentially cause damage to the luminescent species and/or the aerogel.

The radiation of the second energy can also be any electromagnetic radiation or radioactive decay. Preferably, the radiation of the second energy is light, e.g., visible, ultraviolet, or infrared light, especially a wavelength within the visible light range.

The component which acts as the source of the emitted radiation is preferably a luminescent species, e.g., luminescent glasses, phosphors, or mixtures thereof. Phosphors are well known in the art and include, for example, zinc sulfide, copper-activated zinc sulfide, copper and aluminum-activated zinc sulfide, or cadmium sulfide. Many other known phosphor components are discussed in the references listed above.

The phosphor particles are preferably dispersed throughout the porous substrate. For example, soluble or insoluble phosphor particles can be added to a sol dispersion which is subsequently gelled and dried to form a xerogel or, preferably, an aerogel. When water is the dispersion medium, water soluble phosphors such a thallium activated cesium iodide or thallium activated potassium iodide can be used advantageously. In such cases, the use of water soluble phosphors can enhance transparency of the resultant phosphor doped aerogel.

Luminescent glasses, e.g., lithium rich silicate glass doped with cerium, can be ground into a powder and dispersed in, e.g., a silica aerogel. This also can lead to enhanced transparency by closely matching refractive indices. Luminescent phosphors can be incorporated in situ in the sol or either the wet or dry gel.

Other approaches include: (1) making a luminescent aerogel directly using sol-gel chemistry to achieve the appropriate luminescent glass composition, and (2) making a luminescent gel using well known luminescent ionic species. An example of the latter is an alumina based aerogel with $Cr(+++)$ ions substituted for the aluminum, i.e., a "ruby" aerogel. Either approach offers the possibility of a volumetric radiation source with a high degree of optical clarity For a discussion of luminescent glasses, see R. J. Ginther, J. H. Schulman, "Glass Scintillators", Trans. IRE, N.S. Vol. 5, p. 92 (1958) [Ce-activated glass], and Mark D. Newsham, Michael K. Cerreta, Kris A. Berglund, Daniel G. Nocera, "Luminescent Oxide Gels", MRS Res. Soc. Sym. Proc. Vol. 121, pp. 627–630 (1988) [photoluminescence employing molybdenum hexachloride].

The amounts of the first energy radiation source and the component for emitting radiation of second energy can vary within a wide range. The amount of the first energy radiation source must be capable of yielding an amount of first energy radiation sufficient to interact with the component so as to produce a finite amount of radiation. Conversely, the component which produces the radiation of a second energy must be present in an amount sufficient to interact with the radiation of a first energy to produce a finite amount of radiation of a second energy.

The amounts present generally depend on materials used, radiations involved, desired intensity of emitted radiation, and other design choices made in dependence on the end-use. For example, when tritium is the first energy radiation source, it is generally present in an amount of at least about $4.5 \times 10^{-6}$ moles/cm$^3$, preferably at least about $4.5 \times 10$ moles/cm$^3$. The amount of component for emitting radiation of second energy is generally at least about $5.1 \times 10^{-3}$ moles/cm$^3$, preferably at least about $2.0 \times 10^{-2}$ moles cm$^3$.

For tritium as the first energy radiation source, the amount present in the substrate is, for example, at least about 0.002 curies/mg, preferably at least about 0.2 curies/mg.

The ratio of the amount of radiation source of a first energy with respect to the amount of the component emitting the radiation of a second energy can also vary within wide limits and will depend on several factors such as the type of exciting radiation and source, type of component and emitting radiation, the uniformity with which the exciting radiation source and the component are dispersed within the substrate, etc. Generally, the ratio is about 1 to 1000, preferably about 1 to 4. For example, in the case of a silica aerogel containing tritium and a luminescent species, the mole ratio of tritium to luminescent species is generally about 1-1000, preferably about 1-4.

According to another aspect of the invention, either or both the source of exciting radiation of a first energy and the component which emits radiation of a second energy can be loaded into and/or onto a carrier material, and then the latter can be loaded into and/or onto a porous substrate. Thus, for example, the source of radiation of the first energy can be bonded to a carrier material and then the latter can be dispersed within a porous substrate, e.g., a silica aerogel, doped with a component for generating the radiation of a second energy. One type of suitable carrier material would be a hydrogen-containing compound which is capable of undergoing tritium exchange whereby tritium atoms replace hydrogen atoms. An example of a hydrogen-containing material compound which can function as the carrier material is triphenyl phosphite. Also, tritium can, for example, be attached to a hydrogen getter, a component capable of attracting hydrogen, and the resultant tritium loaded getter can then be dispersed in a phosphor doped aerogel. Thus, one three-step process for the production of this embodiment of the invention comprises: (1) tritiating a hydrogen getter using tritium gas; (2) preparing an aerogel, e.g., a silica aerogel, which is doped with an inorganic phosphor, e.g., ZnS; and (3) adding a solution of tritiated hydrogen getter to the inorganic aerogel matrix and then removing the solvent. An example of a suitable hydrogen getter is p-di(phenylethynyl)benzene. See also, U.S. Pat. Nos. 3,896,042 and 3,963,826, which disclose other hydrogen getters.

The carrier material should, of course, possess some finite affinity for the substrate and preferably exhibits a significant affinity therefor. The carrier material can be bonded directly to the surface of the substrate. Examples of materials which can be directly bonded include diphenylvinylchlorosilane, (phenylethynyl)dimethylchlorosilane, and diphenylethynylchlorosilane.

The compositions according to the invention can also find use in applications involving light trapping and wave guiding. Light trapping and wave guiding in high refractive index media is the basis for fiber optics devices. This effect could be utilized to make a radioluminescent light by using thin sheets or long whiskers of, for example, transparently luminescently doped ZnS excited through its entire surface by a suitable exciting radiation source. The resultant light generated in the doped ZnS sheet or doped ZnS long whisker would then be wave guided to the edges of the sheet or the end of the whisker. This light would be intensified since nearly all the light produced in the ZnS volume would emerge from a small area. Such intensified light can be beneficially used in a number of radioluminescent applications (e.g., power sources).

A suitable beta source would be: (1) tritium gas, (2) an organic polymer containing a suitable tritium occluder (organic or inorganic) which could also "glue" the ZnS sheets/whiskers together, or (3) an aerogel containing tritium by hydroxylization or by incorporation of a suitable tritium occluder (organic or inorganic). The main consideration is that, for the ZnS to act as a useful waveguide, the medium in contact with the ZnS sheets/whiskers must maintain a lower index of refraction than the ZnS during the light source's active lifetime.

The FIG. 4 shows a cross-section through a stack of ZnS sheets separated from each other by a space. The space can be filled by tritium gas or a suitable tritium occluder to provide the beta excitation of the ZnS sheet. In accordance with the present invention, the occluder is a thin layer of tritium-"loaded" aerogel, e.g., tritoxylated, loaded with tritium gas, or infused with a tritiated organic occluder.

As discussed above, one embodiment according to the invention involves a powdered phosphor dispersed throughout the aerogel and excited by the radiation source. The resulting light is scattered out of the volume of the composition by the small, highly reflective phosphor particles. In the waveguide approach, the ZnS sheet could be thought of as an "extended" phosphor particle if it is cut and polished from a single crystal. The light generated in the sheet would then be guided out of the interior of the composite, being confined to the sheet by total internal reflection.

Alternatively, ZnS sheets made from transparent, polycrystalline, isotropic material could be thought of as a compaction of individual phosphor particles in close enough contact with each other to permit the light to be guided out. The polycrystalline material can be doped to make it luminescent. The doping process can, for example, be by a molten NaCl salt flux method. Other techniques which may permit doping after the ZnS sheets are cut out and polished, and which should not optically degrade the ZnS sheet surface, are: (1) ion implantation similar to what is used in the commercial electronic semiconductor industry and (2) high temperature exposure to HCl gas to achieve Cl doping. These techniques are also described in the references below.

While the above discussion refers mainly to 2-D waveguides, it should be noted that the principles also apply to long ZnS whiskers which would behave like fibers in fiber optics cables. For that matter, the principles would also apply to long luminescent glass fibers, luminescent glass sheets, or any luminescent material which could be cut and polished or cast in a light trapping and waveguiding form.

The following references discuss techniques for doping: Humboldt W. Leverenz, *An Introduction to luminescence of Solids,* John Wiley & Sons, Inc., New York, 1950 (gives recipes and experimental procedures for the NaCl flux technique); S. Rothschild, "The Luminescent Spectra of Zinc Sulphide and Zinc Cadmium Sulphide Phosphors," Trans. Faraday Soc., Vol 42, No. 290, 635-642, 1946 (NaCl flux technique); F. A. Kroeger and J. E. Helligman, "The Blue Luminescence of Zinc Sulfide," J. Electrochem. Soc., Vol 93, No. 5, 156-171, May 1948 (HCl gas doping results and techniques); M. R. Brown, A. F. J. Cox, W. A. Shand, and J. M. Williams, "Ion Implantation Doping of Zinc Sulphide Thin Films," Solid State Communications, Vol. 9, pp. 37-40, 1971; A. Addamiano, W. H. Lucke, and J. Comas, "Phosphor Preparation by Ion Implantation," Journal of Luminescence, Vol. 6, 143-145, 1973; and F. J. Bryant and R. H. Fewster, "Implantation of Ytterbium Ions into Group II-VI Compounds," Radiation Effects, Vol. 20, pp. 239-244, 1973.

The invention also relates to compositions which contain either the source of exciting radiation of a first energy or a component capable of interacting with radiation of a first energy to emit radiation of a second energy. For example, a porous substrate, e.g., an aerogel, loaded with a source of exciting radiation of a first energy, e.g., tritium, can be employed to generate the exciting radiation which subsequently, directly or indirectly, interacts with a composition capable of producing radiation of a second energy. Alternatively, a porous substrate, e.g., an aerogel, loaded with a component capable of emitting radiation of a second energy, e.g., a phosphor, can be externally excited directly or indirectly by a source of energy of a first radiation. An example of such a composition is a phosphor doped aerogel which emits visible light upon interaction with a source of ultraviolet light.

While the invention has been usually described above in connection with the production of light, the underlying invention can be employed for any application or in any environment in which generation of radiation is desired.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosures of all applications, patents and publications, cited above and below, are hereby incorporated by reference.

BRIEF DESCRIPTION OF THE DRAWINGS

Various other objects, features, and attendant advantages of the present invention will be more fully appreciated as the same becomes better understood when considered in conjunction with the accompanying drawings, in which like reference characters designate the same or similar parts throughout the several views and wherein:

FIGS. 1 and 2 are graphs of sample brightness as a function of tritium gas pressure;

FIG. 3 is a graph of brightness as a function of time and $T_2O$ vapor exposure for sample W-R-3; and FIG. 4 is an illustration of a waveguide embodiment according to the invention.

EXAMPLES

Example I

Preparation of Aerogel/Phosphor Composite

One method for preparation of the aerogel/phosphor composite, involves the following four basic steps:
1. Preparation of a sol-gel stock solution;
2. gelation step, including suspending a phosphor in the stock solution, adding a "gelation promoter" to the mixture, and aging the gel;
3. removal of the original solvent from the gel pores by a solvent exchange/supercritical drying process; and
4. post-treatment (heat, vacuum i atmosphere) to tailor the surface chemistry for most effective tritium uptake.

Processing details

1. Preparation of the Sol-Gel Stock Solution.

| | Approx. molar ratio |
|---|---|
| 61 ml Tetraethoxysilane | 1 |
| 61 ml absolute ethanol | 4 |
| 5 ml deionized water | 1 |
| 0.2 ml 1M HCl | 0.0007 |

Add chemicals to a reaction kettle in the order listed. Seal and heat to 60° C. for 1.5 hr, with stirring. Cool to room temperature.

2. Phosphor Suspension, Gelation, and Aging

Add from 0.05 to 10 grams of desired commercial phosphor powder to 10 milliliters (ml) stock solution (results in the reported phosphor loading ranging from 0.005 to 1.0 gram per cc of stock solution). The phosphor agglomerates in the stock solution are broken up using ultrasonic agitation (about 5 minutes). Two ml of 0.25 molar (M) $NH_4OH$ is added to promote gelation. The OH concentration is about 0.04 M (moles/liter) with a final water to metal alkoxide molar ratio (moles $H_2O/M(OR)_x$ of 6.6 [NOTE: the base catalyst range which will allow gel formation in this system is approximately $2.4 \times 10^{-4}$ M to $3.3 \times 10^{-1}$ M $NH_4OH$ which corresponds to a final molar $H_2O/M(OR)x$ of about 2.6–14.6.]A portion of the sol/phosphor mixture is transferred to a 16 ml polystyrene test tube leaving a 6 ml air space (to form an air bubble which assures efficient mixing). The tube is placed on a commercial hematology mixer which provides end-to-end oscillation with continuous axial rotation ("rock-and-roll"). This is essential for homogeneous suspension of the phosphor particles. Immediately prior to gelation (as indicated by sluggish bubble movement) the tubes are set upright in a test tube rack. At this point, the viscosity of the solution is rapidly increasing and prevents settling of phosphor particles prior to gelation. The phosphor/gel composite is aged at 50° C. about 2 days to allow strengthening of the polymeric network.

3. Solvent Exchange/Critical Point Drying Process

The solvent exchange/critical point drying process is performed in a commercial Critical Point Drying (CPD) apparatus. Gelled samples are immersed in an excess volume of ethanol in the CPD chabber. After the chamber is sealed, $CO_2$ liquid is directly transferred, at the cylinder pressure of about 850 psi, to the cooled chamber (about 18° C.). An equilibrium pressure of about 850 psi is maintained at 18°–20° C. while the vessel is periodically flushed with liquid $CO_2$ to dilute the excess solvent volume and replace the sample solvent within the gel pores [NOTE: fast flush until no immiscibility line visible, slow flush for 24 hrs., fast flush 5 min.]When complete solvent replacement has occurred, the chamber temperature is increased to approximately 38° C. at a rate of about 0.33° C./min. At 31.1° C. and 1070 psi, $CO_2$ passes through its critical point and can no longer exist in the liquid state. The $CO_2$ gas is vented at a rate of less than 100 psi/hr while maintaining the chamber temperatures at 38° C., thus reducing the chamber pressure to ambient. The aerogel/phosphor composite is then removed from the chamber.

4. Aerogel Post-Treatment

After critical point drying treatment, further treatment is used to tailor the aerogel surface chemistry to assure maximum tritium uptake. Aerogels are heated to 150° C. while under vacuum ($10^{-8}$ torr) to remove residual alcohol and physically adsorbed water.

Variations of standard Process

1. Other Suitable Precursors or Sol Processing Conditions a. Most metal alkoxides and mixtures thereof, e.g., Cr-dope $Al_2O_3$. Reference: D. C. Bradley, R. C. Mehrotra, and D. P. Gaur, Metal Alkoxides (Academic Press, London, 1978).

b. Organically-modified alkoxides, e.g., $R'Si(OR)_3$. Reference: R. Anderson, B. Arkles, C. L. Larson, Petrarch Systems Silanes and Silicones (Petrarch Systems, 1987). Advantages: Introduce H (T) exchange sites as non-hydrolyzable ligands such as alkanes, alkenes, etc., hydrophobicity (important for environmental concerns if subjected to ambient moisture due to breakage), introduce organic functionality compatible with organic hydrogen getter.

c. Di- or tri-functional alkoxysilanes, $(RO)_xSiH_{4-x}$. 'Reference: same as 1b. Advantages: introduce H (T) exchange sites as non-hydrolyzable ligands, provide hydrophobicity using a carbon-free, radiation-hard ligand.

d. Control $H_2O/M$, pH, temperature, concentration, solvent, etc. Reference: C. J. Brinker et al., J. Non-Crystl. Solids 63 (1984) 45–59. Advantages: control pore size, density, clarity, rigidity of aerogel matrix.

2. Varying the Phosphor Suspension/Dispersion a. In situ growth and activation of ZnS in wet gel, e.g., zinc salt +sulphidizing agent such as thioacetamide. Reference: D. M. Wilhemy and E. Matijevic, J. Chem. Soc. Faraday Trans., 80 (1984) 563.

b. In situ growth and activation of ZnS in porous dry gel, e.g., $Me_2Zn + H_2S$. Reference: G. E. Coates and D. Ridley, J. Chem. Soc. (1965) 1970. Advantages: same as 2a.

c. Grow or disperse ZnS whiskers or fibers in wet or dry gel. Reference: T. A. Guiton et al., in Better Ceramics Through Chemistry, MRS Symp. Proc. Vol. 121 (Materials Research Society, Pittsburgh, PA, 1988) pp 503–508. Advantages: wave guiding from gel interior, strengthening.

d. Dispersion of ZnS particles in precursor sol by adsorption of polymers or surfactants with or without mechanical agitation. References: D. H. Napper, Polymeric Stabilization of Colloidal Dispersions (Academic Press, London, 1983). Th. F. Tadros (editor), Surfactants (Academic Press, London, 1984). Advantages: avoid agglomeration of ZnS particles in sol/gel.

3. Varying Gelation, Aging, and/or Drying Conditions a. Reduce gel density by reducing the sol concentration or by the addition of an immiscible solvent, foaming agents, etc. Advantage: reduce attenuation of light by matrix and also reduces beta particle energy absorption by the matrix.

b. Trimethylsilylation of the gel surface by reaction with $ClSiMe_3$, $Me_3Si13$ $O-SiMe_3$, etc. using standard silane coupling chemistry. Reference: M. L. Hair in Silanes, Surfaces, and Interfaces, ed. D. E. Leyden (Gordon and Breach, Amsterdam, 1986) pp. 25–42. Advantages: introduce hydrophobicity, gain 9 H (T) exchange sites per surface OH.

c. Aging treatments under various solvent/pH/temperature conditions to optimize aerogel porosity and strength. Reference: C. J. Brinker and G. W. Scherer in Ultrastructure Processing of Ceramics, Glasses, and Composites, eds. L. L. Hench and D. R. Ulrich (Wiley, NY, 1984) p. 43. Advantages: maximize surface area, strength, clarity while minimizing density.

d. Alter the solvent exchange process prior to critical point drying to optimize surface area, strength and clarity, e.g., replace $CO_2$ with freon, or employ a multi-step exchange process such as ethanol-amyl acetate-$CO_2$.

4. Varying Post-Drying Treatments a. Perform multiple dehydroxylation/ rehydroxylation ($T_2O$) treatments to maximize the surface coverage of TO with respect to OH. Reference: C. J. Brinker et al., J. Non-Cryst. Solids 82 (1986) 117–126.

b. Rely on the radiolysis of Si—O—Si bonds with $T_2$ to form Si-T+Si-TO and thus "pump" T into aerogel.

c. Anneal ZnS in different ambients to enhance phosphor activation.

d. Remove residual organics with steam, ozone, peroxide, or plasma treatments.

Example II

Chemically Binding $T_2O$ Vapor to Substrate

A high surface area $SiO_z$ aerogel (greater than 1000 $m^2/g$) is employed as the porous substrate. The aerogel surface has a capacity of 4–5 hydroxy groups per nmz and an estimated density of 150 $mg/cm^2$. This results in a potential of approximately $9 \times 10^{20}$ OH groups per $cm^3$. The phosphor doped aerogel is initially subjected to a combination of high heat and high vacuum to remove OH groups, thereby resulting in a substantially or fully dehydroxylated aerogel. The aerogel is subsequently exposed to $T_2O$ vapor. Exposure to the tritium-containing vapor results in a breakage of strained Si—O—Si bonds or an exchange with Si—OH bonds and the formation of Si-0T and possibly Si—T bonds. Bonded tritium produces a flux of beta particles, which excite the phosphor already contained within the aerogel and results in the release of light. The process of emission occurs at subambient pressures, i.e., less than 1 atmosphere. The composition provides for an amount of tritium to be in close of proximity to the phosphor. The resultant composition would be equivalent to a tritium pressure of 15–20 atmospheres in a gaseous system.

Alternatively, the composition can be subjected to even higher tritium loading, and thus higher light output, by continuing to expose the aerogel to $T_2O$ vapor even after saturation of the aerogel surface has occurred. This can result in possible classic hydrogen-type bonding of additional $T_2O$ onto the surface TO groups, as well as continued hydrolysis of Si—O—Si to form two Si—TO groups.

Example III

A high surface $SiO_2$ aerogel (greater than 1000 $m^2/g$, capacity 4–5 hydroxy groups per $nm^2$, density of about 150 $mg/cm^3$, and approximately about $9 \times 10^{20}$ $OH/cm^3$) is initially substantially or fully hydroxylated. The phosphor doped aerogel is then exposed to nominal gas pressures of about 1 atmosphere of $T_2$ gas. This results in an exchange reaction whereby surface protium (H) atoms are replaced by tritium (T) atoms. Saturation of the surface with TO results in a tritium loading equivalent to about 15-20 atmospheres of tritium gas. Once the surface protium has been completely replaced and extraneous water is absent, the aerogel/phosphor source is radiochemically stable.

The effect of tritium loading can be increased by either: (1) increasing the $T_2$ gas pressure or (2) subsequent exposure to $T_2O$ vapor.

Example IV

Tritium Gas/Aeroqel Experiments

Table 1 lists some of the phosphor/aerogel samples that were tested, the type of phosphor used, and the amount of phosphor added per cc of starting sol-gel base material. The commercial phosphors used were: 1) P-31, Zinc Sulfide, copper activated (ZnS:Cu), and 2) GTE-1260, Zinc Sulfide, copper activated with an aluminum coactivator (ZnS:Cu:Al).

TABLE 1

| Sample Designator | Phosphor Material | Concentration (g/cc) |
| --- | --- | --- |
| W-A-1-1 | P-31 | 0.05 |
| W-A-1-2 | GTE-1260 | 0.25 |
| W-A-1-3 | GTE-1260 | 0.10 |
| W-A-1-4 | GTE-1260 | 0.05 |
| W-A-1-5 | GTE-1260 | 0.025 |
| W-A-2-1 | GTE-1260 | 0.5 |
| W-A-2-2 | GTE-1260 | 0.175 |
| W-A-2-3 | GTE-1260 | 0.05 |
| W-A-2-4 | GTE-1260 | 0.01 |
| W-A-2-5 (Control) | NONE | NONE |
| W-R-3 | GTE-1260 | 0.50 |

The results of the tritium gas experiment are summarized in FIGS. 1 and 2 where the sample brightness in foot Lamberts (fL) is plotted as a function of the tritium gas pressure. They all show an essentially linear increase in optical brightness up to the experimental limit of 1030 Torr. It is expected that this linear response can be designed to persist for up to several tens of atmospheres. This would yield a brighter light than could be obtained from a standard gas tube of comparable dimensions at high pressure since the standard tube's output should saturate at a few atmospheres.

Also plotted for comparison in FIGS. 1 and 2, is the brightness of a bulk phosphor sample. It consisted of a loosely packed GTE-1260 phosphor in a vacuum appendage which was attached to the same gas plenum as the W-a-1-x and W-A-2-x samples. The light output of the bulk sample at the time of these tests was only about 60% of its original brightness. However, even if its output were a factor of 2 higher, the phosphor/aerogel samples W-A-1-2, W-A-1-3, W-A-2-1 and W-A-2-2 would still have been brighter. This is evidence that the phosphor/aerogel composite is indeed functioning as a volumetric light source.

Example v

Tritium Water/Aerosel Experiment

A few small shards were taken from a phosphor/aerogel sample loaded with 0.5 g/cc of GTE-1260 phosphor. These shards were placed in a small glass appendage (designated W-R-3) and exposed to tritium gas at up to 1040 Torr. The light output at 1 atmosphere (760 Torr) was 0.08 fL, comparable to the output of W-A-2-1 of FIG. 1. The volume of the shards was estimated to be about 20 microliters, and contained about 1 mg of phosphor.

These shards were then transferred to another tritium glove box where they were exposed to tritiated water ($T_2O$) vapor. FIG. 3 shows the brightness of sample W-R-3 as a function of time and $T_2O$ vapor exposure. The maximum brightness of 4.6 fL is more than 4 times brighter than the brightest 1 atmosphere gas lamp (about fL), and nearly 10 times brighter than a typical commercially available gas lamp (about 0.4-0.6 fL).

The high brightness level is believed to be due to the desiccant properties of the aerogel which can physisorb and chemisorb water vapor. Here, strained Si—0—Si bonds react with $T_2O$ molecules forming Si—O—T hydroxyl groups. The surface area of a typical aerogel has been measured to be about 1200 m$^2$/g, with an estimated maximum of 5 hydroxyls/nm$^2$. If tritium instead of hydrogen is present at each available hydroxyl site, the amount of bound tritium per cc of aerogel would correspond to an equivalent tritium gas pressure of nearly 17 atmospheres. The result should be a light 17 times brighter than the aerogel exposed to 1 atmosphere of tritium gas. However, note that the brightness of the shards is more than 57 times brighter. This implies that additional water vapor is being pumped or trapped by the aerogel, probably by hydrogen bonding to the hydroxylated surface. From the relative brightness levels with $T_2$ gas and $T_2O$, and the shard volume, the tritium content of the shards at maximum output was estimated to be about 3 curies.

The sample output began to decrease after 16 hours of $T_2O$ exposure. Since the sample appeared to have shrunk, it is believed that so much $T_2O$ vapor had been absorbed in the micropore structure of the aerogel that the SiO$_2$ structure had begun to collapse. This could have caused the gel to become more opaque, reducing the overall light output. Interestingly, when the $T_2O$ was valved off, the output dropped slightly, remained steady for about 24 hours, and then dropped precipitously to about 1.5 fL. Upon re-admitting $T_2O$ vapor, the sample returned to its previous higher output level. When the $T_2O$ was again valved off, the output dropped slightly, and (not shown on the graph), remained steady for about 24 hours. It again dropped precipitously, repeating the earlier pattern. It is suspected that the concentration of the $T_2O$ in the aerogel caused enough local heating that any labile $T_2O$ was eventually distilled out of the gel when it was closed off from the source causing the observed drops in output. This effect might have been eliminated if the tube containing the sample could have been isolated from the cooler glass/metal vacuum hardware where the labile $T_2O$ could have been trapped.

When the tritiated water was cryopumped and vacuum pumped out of the shards at room temperature, a residual light intensity of 0.1-0.2 fL remained. This residual glow may be an indication that some of the tritiated water was either bound as hydroxyls directly, or that the tritium exchanged with previously attached hydroxyls.

Comparative Experiment

Tritiated Water/Zns Phosphor Powder

A small droplet of tritiated water containing from 3 to 10 curies of tritium was dropped onto 50 mg of ZnS (GTE-1260) phosphor powder. Since the dry packing density of ZnS powder is about 2 g/cc, the phosphor volume was about 25 microliters, approximately the same as the aerogel shards described above.

Due to the hydrophobic nature of ZnS, the small droplet of tritiated water did not immediately "wet" the powder. However, where the small droplet contacted the ZnS powder, the brightness measured 3.13 fL. Fifteen hours later, the water had partially permeated into the powder resulting in a mixture of brighter and dimmer spots. The average brightness measured 0.63 fL. Several weeks later, the $T_2O$ appeared to have uniformly permeated the phosphor powder. The measured brightness then was 0.10–0.20 fL.

The final brightness of the $T_2O$/phosphor powder is considerably lower than that obtained with the $T_2O$/aerogel composite in spite of the fact that their respective volumes and curie contents were approximately the same. Assuming that the tritiated water did not migrate and remain at another site in the container, this is additional evidence that the phosphor-aerogel composite acts like a volumetric source.

Example VI

An aerogel containing uniformly dispersed phosphor particles is exposed to a radioactive gas, e.g., tritium, resulting in the filling of the aerogel pores with the radioactive gas. This provides an intermixing of the phosphor and beta particle sources within the porous substrate.

Example VII 1,3-bis(phenylethynyl)benzene and palladium (II) acetylacetonate, one example of a reducible, organometallic palladium or platinum compound, are dissolved in an organic solvent. The resultant solution is added to an inorganic-phosphor-doped aerogel, and subsequently the solvent is removed under reduced pressure. The doped aerogel is treated with hydrogen gas at a pressure and temperature such that the palladium species is reduced to palladium metal, yet the hydrogen-getter component remains unchanged. Volatiles are removed from the matrix under vacuum. The material is then treated with tritium such that the getter is reduced by utilizing the palladium metal as a catalyst. The loading level of tritium is up to about 240 Ci/g.

Alternatively, 1,3-bis(phenylethynl)benzene, as one example of a qetter, is tritiated in the presence of a catalyst, such as palladium metal, and is dissolved in an organic solvent and separated from the catalyst. The tritiated compound is then absorbed onto an inorganic, phosphor-doped aerogel. The resultant composite is then purged of solvent, leaving the tritium-bearing residual compound intimately mixed with the composite.

Example VIII

A hydrogen-bearing compound capable of substantial tritium exchange and possessing some affinity for an inorganic, phosphor-doped aerogel matrix, e.g., triphenylphosphite (which is chemically polar in nature), is added to the inorganic, phosphor-doped aerogel as an additive or dopant to provide additional hydrogen sites in the resultant composite. The resultant composite is then exposed to tritum gas, allowing hydrogen and tritium atoms to exchange over a period of time controlled by conditions, thus tritiating the composite. Alternatively, the hydrogen in a hydrogen-bearing compound can be exchanged for tritium prior to addition of the compound to the inorganic, phosphor-doped aerogel composite.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A composition comprising:
   an aerogel or xerogel substrate loaded with tritium and a component capable of emitting radiation upon interaction of the component with beta particles emitted from the tritium,
   wherein the loading of said aerogel or xerogel substrate with tritium is performed by initially hydrolyzing the surface of the substrate and then subjecting the hydrolyzed substrate to tritium exchange, whereby tritium atoms replace hydrogen atoms of hydrolyzed surface groups, and
   wherein said composition is a volumetric source of radiation.

2. A composition according to claim 1, wherein said substrate is an aerogel.

3. A composition comprising:
   an aerogel or xerogel substrate loaded with tritium and a component capable of emitting radiation upon interaction of the component with beta particles emitted from the tirtium,
   wherein said loading of said aerogel or xerogel substrate with tritium is performed by initially hydrolyzing the surface of the substrate and then subjecting the hydrolyzed substrate to tritium exchange, whereby tritium atoms replace hydrogen atoms of hydrolyzed surface groups,
   wherein said composition is a volumetric source of radiation, and
   wherein said substrate transmits said radiation of said second energy to a substantial degree.

4. A composition according to claim 3, wherein said substrate is a silica aerogel.

5. A composition according to claim 3, wherein said substrate has a pore volume of at least about 95 vol. %.

6. A composition according to claim 3, wherein said substrate has a pore size distribution of about 1 nm–500 nm and a surface area of at least about 300 m²/g.

7. A composition according to claim 3, wherein tritium is present in said substrate in an amount of at least about $4.5 \times 10$ moles/cm³.

8. A composition according to claim 3, wherein the amount of tritium present is at least about 0.002 curies/mg of substrate.

9. A composition according to claim 3, wherein said radiation comprises a wavelength within the visible light range.

10. A composition according to claim 3, wherein said component is present in said substrate in the amount of at least about $5.1 \times 10^{-3}$ moles/cm³.

11. A composition according to claim 3, wherein said component is a phosphor.

12. A radiation-emitting device comprising a container having contained therein a composition according to claim 1 and wherein said container transmits said radiation of said second energy to a substantial degree.

13. A radiation-emitting device according to claim 12, wherein said component is a phosphor and said radiation comprises a wavelength in the visible light range.

14. In a radiation-emitting composition comprising tritium and a component which emits non-$\beta$ radiation upon interaction with $\beta$-radiation emanating from said tritium, wherein the improvement comprises:
an aerogel or xerogel substrate loaded with tritium and a component capable of emitting radiation upon interaction of the component with beta particles emitted from the tritium, wherein the loading of said aerogel of xerogel substrate with tritium is performed by initially hydrolyzing the surface of the substrate and then subjecting the hydrolyzed substrate to tritium exchange, wherein tritium atoms replace hydrogen atoms of hydrolyzed surface groups, and said composition volumetrically emits said non-$\beta$ radiation.

15. A composition according to claim 1, wherein said substrate is xerogel.

* * * * *